(12) United States Patent
Repine

(10) Patent No.: US 7,152,364 B1
(45) Date of Patent: Dec. 26, 2006

(54) TREBLE HOOK PROTECTOR APPARATUS

(76) Inventor: Charles Edward Repine, 136 Sandy Lake Cir., Fayetteville, GA (US) 30214

( * ) Notice: Subject to any disclaimer, the term of this patent is extended or adjusted under 35 U.S.C. 154(b) by 0 days.

(21) Appl. No.: 10/985,224

(22) Filed: Nov. 9, 2004

(51) Int. Cl.
*A01K 97/06* (2006.01)
(52) U.S. Cl. .................................................. 43/57.1
(58) Field of Classification Search ............. 43/57.1, 43/43.2, 43.6
See application file for complete search history.

(56) References Cited

U.S. PATENT DOCUMENTS

| | | | | | |
|---|---|---|---|---|---|
| 867,439 | A | * | 10/1907 | Staehle | 43/43.2 |
| 1,255,516 | A | * | 2/1918 | Daller | 43/57.1 |
| 2,204,185 | A | * | 6/1940 | Lougheed | 43/57.1 |
| 2,482,881 | A | * | 9/1949 | Sonner, Jr. | 43/57.1 |
| 2,550,039 | A | * | 4/1951 | Carlson | 43/57.1 |
| D167,803 | S | * | 9/1952 | Miller | 43/57.1 |
| 2,614,359 | A | * | 10/1952 | Galbraith et al. | 43/57.1 |
| 2,616,209 | A | * | 11/1952 | Ploen | 43/57.1 |
| 2,685,756 | A | * | 8/1954 | Mowbray | 43/57.1 |
| 2,703,467 | A | * | 3/1955 | Shepherd | 43/57.1 |
| 2,711,611 | A | * | 6/1955 | Miner | 43/57.1 |
| 2,775,060 | A | * | 12/1956 | Barker | 43/57.1 |
| 2,812,611 | A | * | 11/1957 | Messick | 43/57.1 |
| 2,841,917 | A | * | 7/1958 | Haskell | 43/57.1 |
| 2,932,118 | A | * | 4/1960 | Jend | 43/57.1 |
| 3,331,152 | A | * | 7/1967 | Starrett | 43/57.1 |
| 3,363,357 | A | * | 1/1968 | Sokol | 43/57.1 |
| 3,512,295 | A | * | 5/1970 | Barge | 43/57.1 |
| 3,645,419 | A | * | 2/1972 | Shorrock | 43/57.1 |
| 3,815,274 | A | * | 6/1974 | Schleif | 43/57.1 |
| 4,217,721 | A | * | 8/1980 | Hershberger | 43/43.2 |
| 4,452,003 | A | * | 6/1984 | Deutsch et al. | 43/57.1 |
| 4,614,054 | A | * | 9/1986 | Fovenyessy | 43/43.2 |
| 4,667,433 | A | * | 5/1987 | Thompson, Jr. | 43/57.1 |
| 4,757,637 | A | * | 7/1988 | Christensen | 43/57.1 |
| 4,833,814 | A | * | 5/1989 | Zygutis | 43/43.2 |
| 4,869,012 | A | * | 9/1989 | Brenholt | 43/43.2 |
| 5,123,199 | A | * | 6/1992 | Lysohir et al. | 43/57.1 |
| 5,335,444 | A | * | 8/1994 | Janeiro | 43/57.1 |
| 5,502,916 | A | * | 4/1996 | Krewson, Jr. | 43/57.1 |
| 6,082,040 | A | * | 7/2000 | Burk | 43/43.6 |
| 7,069,687 | B1 | * | 7/2006 | Jang | 43/57.1 |
| 2005/0091910 | A1 | * | 5/2005 | Jang | 43/57.1 |

FOREIGN PATENT DOCUMENTS

| | | | | |
|---|---|---|---|---|
| DE | 29608745 U1 | * | 8/1996 |
| JP | 8-238048 A | * | 9/1996 |
| JP | 9-65810 A | * | 3/1997 |

(Continued)

*Primary Examiner*—Darren W. Ark
(74) *Attorney, Agent, or Firm*—Cantor Colburn LLP

(57) ABSTRACT

A treble hook protector apparatus. The apparatus is typically a single molded piece. The apparatus typically includes two outer fins or handles that are pressed together to spread apart side walls at an integral hinge to "open" the protector to insert the shaft of the hook. A central clasp opens allowing the hook to be inserted into the central channel. One of the three hooks rests inside the channel. The other two hooks rest against the outer winged walls. A bottom plate prevents the hook from falling out. The central clasp prevents the hook from pushing above the upper walls. The outer lips help prevent surfaces such as fabric from entering past the walls and onto the hooks. In addition, when the hook is removed, the fins can once again be engaged to open the device and allow the device to be clipped onto some suitable edge to temporarily store the device.

13 Claims, 3 Drawing Sheets

FOREIGN PATENT DOCUMENTS

| | | | | |
|---|---|---|---|---|
| JP | 9-140307 A | * | 6/1997 |
| JP | 9-294509 A | * | 11/1997 |
| JP | 2000-300138 A | * | 10/2000 |
| JP | 2001-37390 A | * | 2/2001 |
| JP | 2001-204337 A | * | 7/2001 |
| JP | 2002-125556 A | * | 5/2002 |
| JP | 2002-142636 A | * | 5/2002 |
| JP | 2002-238428 A | * | 8/2002 |
| JP | 2002-320434 A | * | 11/2002 |
| JP | 2003-61537 A | * | 3/2003 |
| JP | 2003-289779 A | * | 10/2003 |
| JP | 2004-24222 A | * | 1/2004 |
| SE | 9400388 A | * | 8/1995 |
| WO | WO-82/03213 A1 | * | 9/1982 |
| WO | WO-89/11791 A1 | * | 12/1989 |
| WO | WO-03/077647 A1 | * | 9/2003 |
| WO | WO-2004/032619 A1 | * | 4/2004 |

* cited by examiner

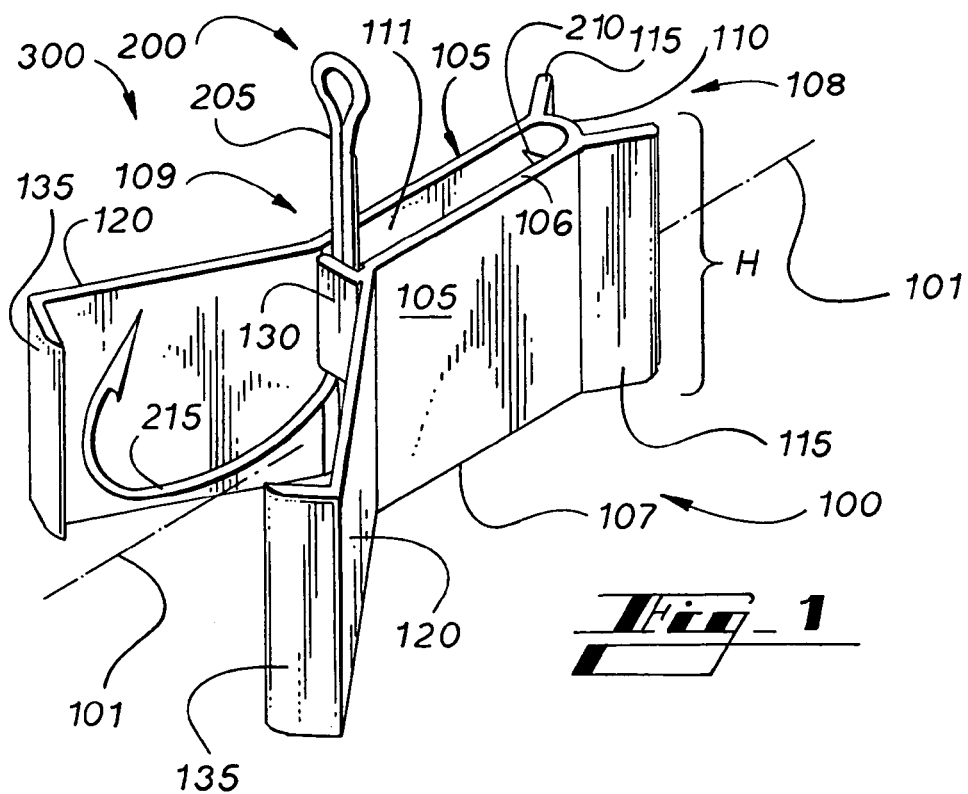
Fig_1
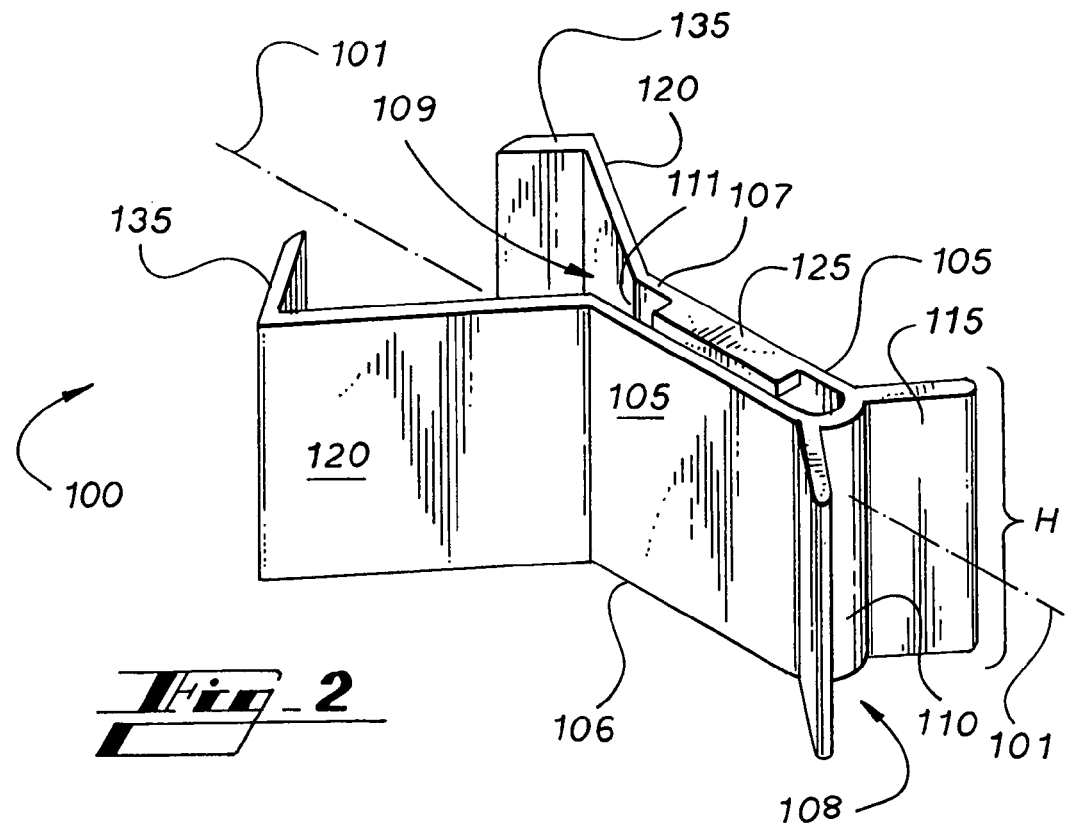
Fig_2

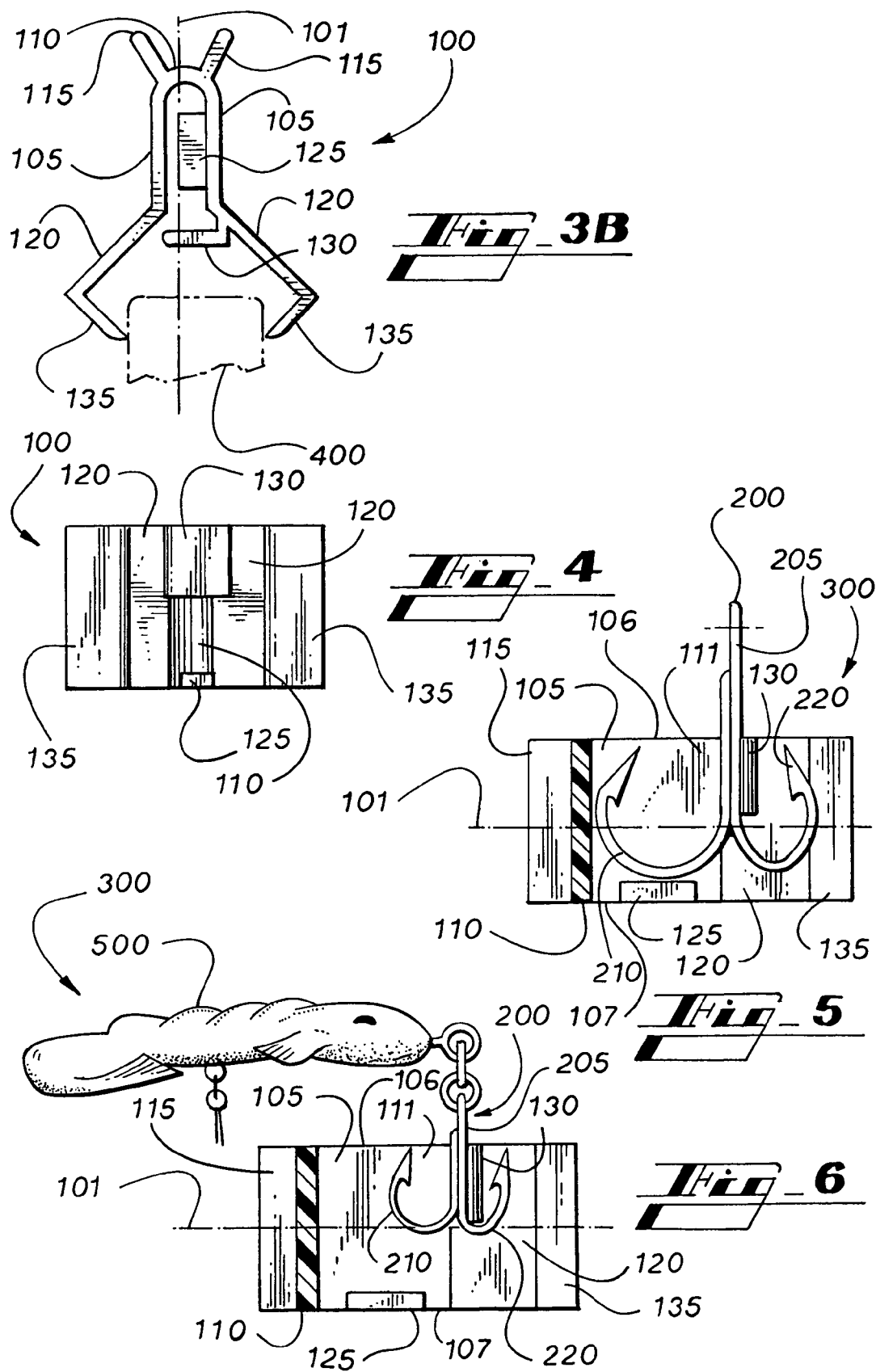

TREBLE HOOK PROTECTOR APPARATUS

BACKGROUND

I. Field of the Invention

The present invention relates generally to the field of fishing and more particularly to a treble hook protector apparatus.

II. Description of the Related Art.

Fish hooks can become snagged on various surfaces including the fisher's skin. As such, fishing hook protectors are needed. In particular, treble fish hooks typically attached to lures and of all sizes have three hooks arranged in a circular arrangement that can become easily tangled. Present treble hook protectors typically include some sort of hollow interior into which the hooks are inserted. Many present fishing hook protectors require that the user grasp both the protector and the hook to attach the protector. By the user having to grasp the hook, the user is exposed to further hook entanglement. In addition, the hooks are actually difficult to insert and remove from present hook protectors. This process can be difficult and can cause injury when attaching and removing the protector.

SUMMARY

In general, the invention features a fishing hook protector apparatus, specifically for a treble hook that typically hangs from lures. The hooks can be for fresh and salt water and of many different sizes. The present invention has several advantages because it is formed of a single molded piece. In general, the apparatus includes two outer fins or handles that are pressed together to spread apart side walls at an integral hinge to "open" the protector to insert the shaft of the hook. By opening the device, a central clasp opens allowing the hook to be inserted into the central channel. When placed, one of the three hooks rests inside the channel. The other two hooks rest against the outer winged walls. A bottom plate prevents the hook from falling out from the device. The outer lips serve two purposes. First, they help prevent surfaces such as fabric from entering past the walls and onto the hooks. Second, when the hook is removed, the fins can once again be engaged to open the device and allow the device to be clipped onto some suitable edge to temporarily store the device.

In general, in one aspect, the invention features a hook protector apparatus, including side walls having an upper end and a lower end, arranged generally parallel, connected by an integral hinge at a first end of the side walls and arranged parallel to a central axis, fins connected adjacent the integral hinge, a winged wall connected to each of the side walls, the winged walls projecting outwards from the central axis, a bottom plate connected to the lower end of one of the side walls and generally perpendicular to the side walls and a central clasp connected to one of the side walls, adjacent the upper end and generally perpendicular to the side walls and the bottom plate.

In one implementation, the apparatus further includes a channel formed between the side walls.

In another implementation, the apparatus further includes an outer lip connected to each of the winged walls and projecting inward toward the central axis.

In another implementation, the upper end of the side walls, the integral hinge and the central clasp form a closed loop.

In another implementation, the closed loop is opened when a force is applied to the fins toward the central axis thereby pivoting the side walls about the integral hinge to a non-parallel position with respect to the central axis.

In another implementation, the closed loop is opened by a spaced being created adjacent the central clasp and upper end of the side wall opposed to the side wall connected to the central clasp.

In another aspect, the invention features a hook protector system, including a hook protector apparatus, having side walls having an upper end and a lower end, arranged generally parallel, connected by an integral hinge at a first end of the side walls and arranged parallel to a central axis, fins connected adjacent the integral hinge, a winged wall connected to each of the side walls, the winged walls projecting outwards from the central axis, a bottom plate connected to the lower end of one of the side walls and generally perpendicular to the side walls, a central clasp connected to one of the side walls, adjacent the upper end and generally perpendicular to the side walls and the bottom plate and a treble hook having a central shaft, a first, second and third hook arranged about the central shaft, wherein the central shaft is adjacent the central clasp and perpendicular to the central axis, the first hook is located between the side walls, the second hook is located adjacent one of the winged walls and the third hook is located adjacent the other of the winged walls.

In one implementation, the first hook is further located adjacent the bottom plate thereby preventing the treble hook from moving past the bottom plate.

In another implementation, the apparatus further includes an outer lip connected to each of the winged walls and projecting inward toward the central axis and enclosing the second and third hooks.

In another implementation, the upper end of the side walls, the integral hinge and the central clasp form a closed loop thereby preventing the shaft from moving past the central clasp.

In another implementation, the closed loop is opened when a force is applied to the fins toward the central axis thereby pivoting the side walls about the integral hinge to a non-parallel position with respect to the central axis.

In another implementation, the closed loop is opened by a spaced being created adjacent the central clasp and upper end of the side wall opposed to the side wall connected to the central clasp, thereby allowing the central shaft of the hook to pass by the central clasp.

In another aspect, the invention features a hook protector apparatus enclosing a treble hook having a central shaft a first hook, second hook and third hook, the apparatus including side walls arranged generally parallel to one another, connected by an integral hinge at a first end of the side walls, the side walls enclosing the first hook and the central shaft, a winged wall connected to each of the side walls, the winged walls projecting outwards from the side walls, wherein the second hook is adjacent to one of the winged walls and the third hook is adjacent the other of the winged walls, means for preventing the first hook from projecting from a lower end of the apparatus and means for preventing the second and third hooks from projecting from an upper end of the apparatus.

In another implementation, the means for preventing the first hook from projecting from a lower end of the apparatus is a bottom plate connected to a lower end of one of the side walls.

In another implementation, the means for preventing the second and third hooks from projecting from an upper end of the apparatus is a central clasp connected to an upper end of one of the side walls.

One advantage of the invention is that the apparatus provides thorough coverage and therefore protection of all hooks of a treble hook.

Another advantage of the invention is that snagging on the hook tips is prevented.

Another advantage of the invention is that the apparatus can be easily scaled to protect the smallest to the largest of treble hooks, including both fresh and salt water hooks.

Another advantage of the invention is that the user does not have to engage the hook to apply and remove the protector apparatus to the hook.

Another advantage of the invention is that the protector can be conveniently clasped to a stationary object or conveniently stored away when not in use.

Another advantage of the invention is that several protectors can be used on a lure having several treble hooks.

Another advantage of the invention is that lures can be stored with the protector apparatus applied to the hooks.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a top and front perspective view of an embodiment of a treble hook protector apparatus containing a treble hook;

FIG. 2 illustrates a bottom and rear perspective view of an embodiment of a treble hook protection apparatus;

FIG. 3B illustrates a top view of an embodiment of a treble hook protector apparatus in a second closed position and connected to an edge;

FIG. 4 illustrates a front view of an embodiment of a treble hook protector apparatus;

FIG. 5 illustrates a partial cutaway side view of an embodiment of a treble hook protector apparatus containing a treble hook; and FIG. 6 illustrates a partial cutaway side view of an embodiment of a treble hook protector apparatus containing a treble hook attached to a fishing lure.

DETAILED DESCRIPTION

Figure 3A:
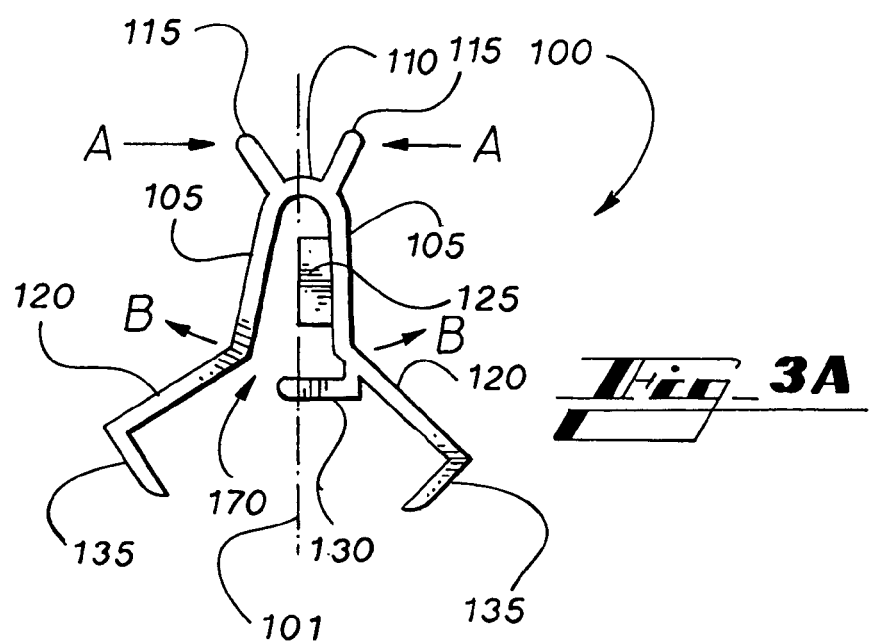
FIG. 3A illustrates a top view of an embodiment of a treble hook protector apparatus in a first open position.

Referring to the drawings wherein like reference numerals designate corresponding parts throughout the several figures, reference is made first to FIG. 1 that illustrates a top and front perspective view of an embodiment of a treble hook protector apparatus 100 containing a treble hook 200 thereby forming a treble hook protector system 300. In general, treble hooks 200 are well known and include a central shaft 205 and three hooks 210, 215, 220 arranged about the central shaft 205. The second hook 215 is shown and the first hook is partially shown in the figure.

The hook protector apparatus 100 generally includes side walls 105 having an upper end 106 and a lower end 107. The side walls 105 are arranged generally parallel to one another and are connected by an integral hinge 110. The integral hinge 100 is formed at a first end 108 of the side walls 105. The side walls 105 are further arranged generally parallel to a central axis 101. In general, the parallel arrangement of the side walls 105 with the integral hinge 110 form a channel 111 in between the side walls 105.

The apparatus 100 further includes fins 115 connected adjacent the integral hinge 110. In general, the fins 115 form handles for the apparatus 100 and are generally arranged projecting outward from the central axis 101. The fins 115 can be a variety of heights but are typically the height H of the overall apparatus 100. In another embodiment, the height of the fins 115 can be less than the height H of the apparatus 100. The apparatus 100 further includes a winged wall 120 connected to each of the side walls 105.

The winged walls 120 generally project outwards from the central axis 101. The apparatus 100 further includes an outer lip 135 connected to each of the winged walls 120 and projecting inward toward the central axis 101. The lips 135 are typically connected perpendicular to the winged walls 120 although other angular attachments are contemplated.

The apparatus 100 further includes a bottom plate 125 (as better viewed in the figures below) connected to the lower end 107 of one of the side walls 105 and generally perpendicular to the side walls 105. A central clasp 130 is connected to one of the side walls 105 and is generally adjacent the upper end 106 of the side walls 105. In addition, the central clasp 130 is generally perpendicular to the side walls 105 and the bottom plate 125 as well as the central axis 101. The central clasp 130 is typically a rectangular shape although it is understood that other shapes are contemplated.

In a typical embodiment, the upper end of the side walls 106, the integral hinge 110 and the central clasp 130 form a continuous closed loop that keeps the shaft 205 of the hook 200 contained within the channel 111, with the shaft 205 adjacent the central clasp 130. Although the central clasp 130 is connected to only one of the side walls 105, the very close proximity of the central clasp 130 to the other side wall 105 effectively creates this closed loop. The central clasp 130 generally is shorter than the overall height H of the apparatus 100. There are a variety of heights h that the central clasp 130 can have. In general, the height h of the central clasp 130 is such that when the curvature of the hooks 215, 220 contact the central clasp 130, the hooks 215, 220 remain contained within the apparatus 100. If the height h is too short, then the tips of the hooks 215, 220 can project upwards and out from the apparatus 100 and can become snagged. If the height h of the central clasp 130 is too large, then the hook 200 can not be properly inserted into the apparatus 100 because the hook 200 cannot be properly positioned with respect to the bottom plate 125 as described further below.

The insertion and removal of the hook 300 into and out of the apparatus 100 is discussed further below with respect to the descriptions of FIGS. 3A and 3B.

FIG. 2 illustrates a bottom and rear perspective view of an embodiment of a treble hook protection apparatus 100. As described above, the hook protector apparatus 100 generally includes side walls 105 having an upper end 106 and a lower end 107 and arranged parallel to a central axis 101 forming a channel 111 therebetween. The side walls 105 are arranged generally parallel to one another and are connected by an integral hinge 110. The integral hinge 100 is formed at a first end 108 of the side walls 105. Fins 115 are connected adjacent the integral hinge 110 and generally projecting outward from the central axis 101. Winged walls 120 connected to each of the side walls 105 and generally project outwards from the central axis 101. An outer lip 135 connected to each of the winged walls 120 and projecting inward toward the central axis 101. The figure illustrates the bottom plate 125 connected to the lower end 107 of one of the side walls 105 and generally perpendicular to the side walls 105. Although the bottom plate 125 is connected to only one of the side walls 105, the bottom plate 125 is in close proximity to the other side wall 105. The bottom plate 125 is typically a rectangular shape although it is understood that other shapes are contemplated. The central clasp 130 (see FIG. 1 above) is connected to one of the side walls 105 and is generally adjacent the upper end 106 of the side walls 105. In addition, the central clasp 130 is generally perpendicular to the side walls 105 and the bottom plate 125 as well as the central axis 101. It is further appreciated that the bottom plate 125 prevents the hook 210 within the channel 111 from falling from the bottom of the apparatus 100 when the hook 200 is held within the apparatus 100.

FIG. 3A illustrates a top view of an embodiment of a treble hook protector apparatus 100 in a first open position. As described above, the hook protector apparatus 100 generally includes the side walls 105, the integral hinge 110, fins 115, winged walls 120, outer lips 135, bottom plate 125 and central clasp 130. The top view illustrates that a force can be applied to the fins 115 in the direction as indicated by arrows A. The force is typically applied by a user's thumb and opposing finger. The force applied in the direction A allows the apparatus 100 to "open" generally in the direction as indicated by arrow B, thereby creating a space 170 between the central clasp 130 and one of the side walls 105 as shown. The entire apparatus 100 pivots about the integral hinge 110. The force also separates the side walls 105 from their parallel position with respect to each other and the central axis 101 to a non-parallel position with respect to the central axis 101. The force also separates the other components from each other including the winged walls 120 and the outer lips 135. The space 170 allows a shaft 205 of a treble hook 200 to be inserted into the channel 111. In addition, the closed loop as described above is opened to allow the insertion of the treble hook 200. In general, as seen further in the figures below, the user does not touch the hook 200. Since several treble hooks hang from a typical fishing lure, the user need only to grasp the lure and let the hooks hang under the force of gravity. By grasping the apparatus by the fins 115 and applying the force as described above, the user simply positions the hook as described. When the treble hook 200 is placed as described, the user releases the force on the fins 115 and the apparatus 100 closes upon the hook 200. In general, the closing direction is generally in the opposite direction of the arrow B. When the apparatus 100 closes, the first hook 210 positions within the channel 111, the shaft 205 rests against the central clasp 130 and the second and third hooks 215, 220 are pressed by the winged walls 120 and covered by the outer lips 135.

It is appreciated that the apparatus is typically manufactured using a rigid and resilient material in order to allow the apparatus 100 to be opened upon applying a force but to restore to its closed position upon removing the force. However, the material used is flexible enough so that a user does not have to apply an unreasonably large force to open the apparatus 100. In addition, the material includes properties that prevent fatigue from occurring at fatigue points such as the integral hinge 110.

FIG. 3B illustrates a top view of an embodiment of a treble hook protector 100 apparatus in a second closed position and connected to an edge 400. As described above, the hook protector apparatus 100 generally includes the side walls 105, the integral hinge 110, fins 115, winged walls 120, outer lips 135, bottom plate 125 and central clasp 130. The top view is shown without any force applied to the apparatus 100. However, the apparatus 100 is shown attached to an edge 400. This figure illustrates that the outer lips 135 can be used to attach the apparatus 100 to a suitable edge 400 when it is not being used. Typically, when the user is fishing and removed the apparatus 100 from the hook 200, the user can apply a force to the fins 115 and put the outer lips 135 in proximity of an edge 400 and then release the force to allow the outer lips 135 to grasp the edge 400 thereby securing the apparatus 100. Since the apparatus 100 is typically small, it is useful to attach the apparatus 100 in this manner so as not to lose the apparatus. Typically, the edge 400 can be the edge of a boat or other nearby structure. In another embodiment, an elongated holder can be included with the protector apparatus 100. Several protector apparatuses can be latched onto the holder.

FIG. 4 illustrates a front view of an embodiment of a treble hook protector apparatus 100. The view illustrates the front orientation of the constituent components including the winged walls 120 and outer lips 135, the integral hinge 110, bottom plate 125 and central clasp 130.

The above description has mentioned that the apparatus 100 can accommodate several different sizes of hooks. The following figures illustrate two different sized hooks accommodated in the same apparatus. It is understood that the apparatus 100 can be made into different sizes as needed for drastically different sized hooks.

FIG. 5 illustrates a partial cutaway side view of an embodiment of a treble hook protector apparatus containing a large treble hook 200 thereby forming a treble hook protector system 300. In the figure, the first hook 210 is shown in a relatively snug orientation within the channel 111 butted against the bottom plate 125 and a portion of the integral hinge 110. The third hook 220 is shown resting against the winged wall 120. In general, the bottom plate 125 prevents the hook from coming out of the bottom of the apparatus 100. In addition, the curvature of the hooks 215, 220 prevent the hook 200 from passing by the central clasp, thereby preventing the hook from coming out of the top of the apparatus 100.

FIG. 6 illustrates a partial cutaway side view of an embodiment of a treble hook protector apparatus containing a treble hook 200 attached to a fishing lure 500, thereby forming a treble hook protector system 300. This figure illustrates a scaled down version of the hook 200. Even with the hook being much smaller, the apparatus 100 still provides protection. The hook 210 is within the channel 111, but is not as snug as described with respect to FIG. 5. The curvature of the hook 220 still is met by the central clasp 130 thereby preventing the hook 200 from coming out of the top of the apparatus 100. The attachment of the lure 500 generally prevents the hook from coming out of the bottom of the apparatus 100. If the lure 500 were not present, the hook would still be prevented from coming out of the bottom of the apparatus 100 because the bottom plate 125 would prevent it from coming out.

Several of the embodiments of the hook protector apparatuses can be packaged together as a hook protector kit. Furthermore, embodiments of the apparatuses can be included with treble hooks and lures having treble hooks as treble hook protector kits. In addition, as mentioned above, a storage edge can be included having several protector apparatuses on it.

Figure 7:
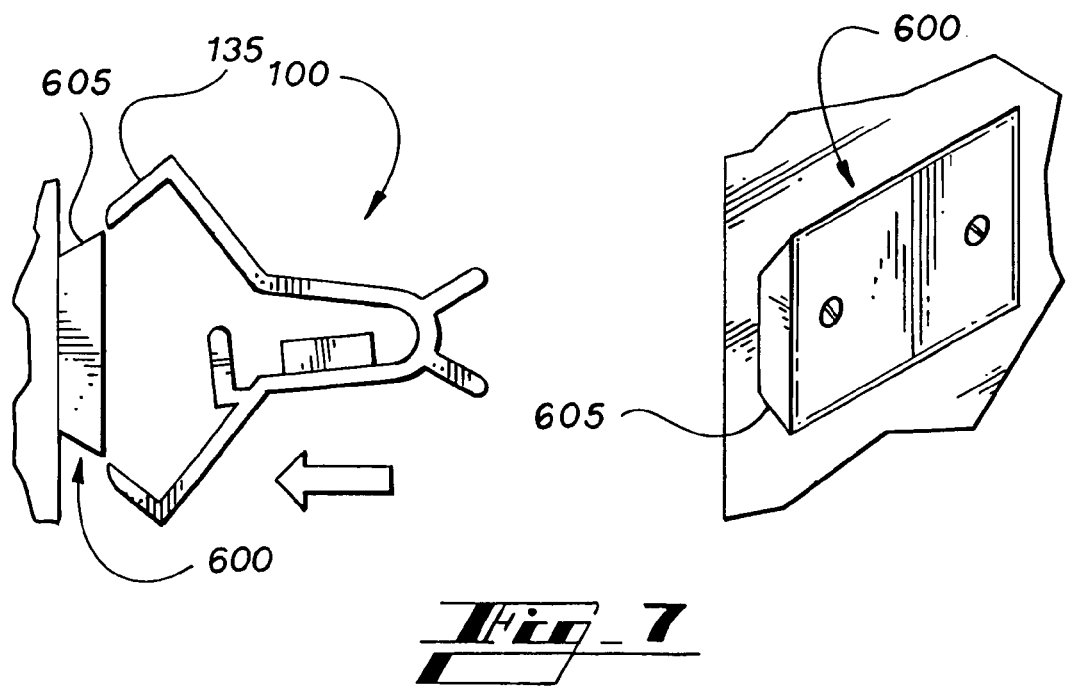
FIG. 7 illustrates two views of an embodiment of a storage edge.

FIG. 7 illustrates two views of an embodiment of a protector apparatus storage edge 600. The edge 600 can include one or more protector apparatuses 100 on it. The edge 600 can be included as a protector apparatus system. In general, the edge 600 can be connected to any suitable surface by screws, adhesive or any other suitable connection device. The edge 600 includes angled sides 605 to receive and maintain the lips 135.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A hook protector system, comprising:
   a hook protector apparatus, comprising:
   straight side walls, each having an upper end and a lower end, arranged generally parallel to one another, connected by an integral hinge at first ends of the side walls and arranged parallel to a central axis, the integral hinge having a resiliency inherent to the integral hinge, the side walls and the hinge forming a continuous surface;
   fins connected to the side walls at a curvature having an apex that defines the integral hinge, the fins flanking and adjacent the integral hinge, and further flaring outwardly from the central axis;
   a winged wall connected to each of the side walls, the winged walls flaring outwardly from the central axis, the outward flaring direction being opposite the outward flaring direction of the fins;
   a bottom plate connected to the lower end of one of the side walls and disconnected from the other of the side walls, thereby forming a gap between the bottom plate and the other of the side walls and generally perpendicular to the side walls;
   a central clasp connected to one of the side walls and disconnected from the other of the side walls, thereby forming a gap between the central clasp and the other of the side walls, adjacent the upper end and generally perpendicular to the side walls and the bottom plate; and
   a treble hook having a central shaft, a first, second and third hook arranged about the central shaft, wherein the central shaft is adjacent the central clasp and perpendicular to the central axis and generally parallel to the integral hinge, the first hook is located between the side walls, the second hook is located adjacent one of the winged walls and the third hook is located adjacent the other of the winged walls,
   wherein the gap between the central clasp and the other of the side walls is smaller than a diameter of the central shaft of the treble hook, thereby preventing the central shaft from passing through the gap.

2. The system as claimed in claim 1 wherein the first hook is located adjacent the bottom plate thereby preventing the treble hook from moving past the bottom plate.

3. The system as claimed in claim 1 further comprising an outer lip connected to each of the winged walls and projecting inward toward the central axis and enclosing the second and third hooks.

4. The system as claimed in claim 1 wherein the upper ends of the side walls, the integral hinge and the central clasp form a closed loop thereby preventing the shaft from moving past the central clasp.

5. The apparatus as claimed in claim 4 wherein the closed loop is opened when a force is applied to the fins toward the central axis thereby pivoting the side walls about the integral hinge to a non-parallel position with respect to the central axis.

6. The apparatus as claimed in claim 5 wherein the closed loop is opened by a space being created adjacent the central clasp and upper end of the side wall opposed to the side wall connected to the central clasp, thereby allowing the central shaft of the hook to pass by the central clasp.

7. The apparatus as claimed in claim 1 whereby the pressing together of the fins by a user causes the winged walls to separate from one another, causes an increase in the gap between the other of the sidewalls and the bottom plate, and further causes an increase in the gap between the other of the sidewalls and the central clasp, thereby allowing passage of the central shaft of the treble hook through the gaps.

8. A hook protector apparatus, comprising:
   a first side wall having a first end and a second end, an upper end and a lower end, and being oriented parallel to a longitudinal axis of the hook protector apparatus;
   a second side wall having a first end and a second end, an upper end and a lower end, and being oriented parallel to the longitudinal axis and to the first side wall;
   an resilient hinge integral to the first and second side walls, the resilient hinge having a hemispherical curvature having an apex, and thereby forming a first closed end, wherein the apex is oriented such that it extends across the longitudinal axis, the side walls and the resilient hinge forming a continuous surface;
   fins connected to the first end of the first and second side walls and also extending from the hemispherical curvature, flanking and adjacent the integral hinge, and flaring outwardly from the longitudinal axis;
   a winged wall connected to each of the second ends of the side walls, the winged walls flaring outwardly from the longitudinal axis in opposite directions of the outwardly flare of the fins from the longitudinal axis;
   a generally rectangular bottom plate connected to the lower end of one of the side walls and generally perpendicular to the side walls and parallel to the longitudinal axis, a gap being formed between the bottom plate and the side wall to which the bottom plate is not connected; and
   a generally rectangular central clasp connected to one of the side walls, adjacent the upper end and generally perpendicular to the side walls, the bottom plate, and the longitudinal axis, a gap being formed between the central clasp and the side wall to which the central clasp is not connected.

9. The apparatus as claimed in claim 8 further comprising an elongated channel formed between the side walls.

10. The apparatus as claimed in claim 8 further comprising an outer lip connected generally perpendicular to each of the winged walls and projecting inward toward the longitudinal axis.

11. The apparatus as claimed in claim 8 wherein the upper ends of the side walls, the integral hinge and the central clasp form a closed loop.

12. The apparatus as claimed in claim 11 wherein the closed loop is opened when a force is applied to the fins toward the longitudinal axis thereby pivoting the side walls about the integral hinge to a non-parallel position with respect to the longitudinal axis.

13. The apparatus as claimed in claim 12 wherein the closed loop is opened by a space being created adjacent the central clasp and the upper end of the side wall opposed to the side wall connected to the central clasp.

* * * * *